(12) United States Patent
Michioka et al.

(10) Patent No.: US 6,782,962 B2
(45) Date of Patent: Aug. 31, 2004

(54) VEHICLE TRACTION CONTROL SYSTEM

(75) Inventors: Hirofumi Michioka, Fujisawa (JP); Toshiya Mori, Fuji (JP)

(73) Assignee: Jatco Ltd., Fuji (JP)

( * ) Notice: Subject to any disclaimer, the term of this patent is extended or adjusted under 35 U.S.C. 154(b) by 31 days.

(21) Appl. No.: 10/133,189

(22) Filed: Apr. 26, 2002

(65) Prior Publication Data

US 2002/0157888 A1 Oct. 31, 2002

(30) Foreign Application Priority Data

Apr. 26, 2001 (JP) .................................. 2001-128817

(51) Int. Cl.[7] .............................................. B60K 17/35
(52) U.S. Cl. ...................................................... 180/197
(58) Field of Search ........................... 180/197; 701/53, 701/54, 55, 56, 62, 70, 82, 87, 90; 477/121, 125; 123/332, 333

(56) References Cited

U.S. PATENT DOCUMENTS

| | | | | |
|---|---|---|---|---|
| 5,046,009 A | * | 9/1991 | Abo et al. ..................... 701/86 |
| 5,047,940 A | * | 9/1991 | Onaka et al. .................. 701/87 |
| 5,291,965 A | * | 3/1994 | Takata .......................... 180/197 |
| 5,365,443 A | * | 11/1994 | Tsuyama et al. .............. 701/83 |
| 5,628,378 A | * | 5/1997 | Saito et al. .................. 180/197 |
| 5,677,840 A | * | 10/1997 | Futawatari ..................... 701/87 |
| 5,931,762 A | * | 8/1999 | Koyama et al. ............. 477/143 |
| 6,188,946 B1 | * | 2/2001 | Suzuki et al. ................ 701/62 |
| 6,217,477 B1 | * | 4/2001 | Nobumoto et al. .......... 477/43 |

FOREIGN PATENT DOCUMENTS

| EP | 1253042 A2 | * 10/2002 | ........... B60K/28/16 |
|---|---|---|---|
| JP | 10-035329 | 2/1998 | |

* cited by examiner

*Primary Examiner*—Lesley D. Morris
*Assistant Examiner*—Daniel Yeagley
(74) *Attorney, Agent, or Firm*—Klarquist Sparkman, LLP

(57) ABSTRACT

A traction control system for a vehicle with an automatic transmission eliminates acceleration slip of wheels by fuel-cut for stopping fuel supply to an engine upon occurrence of the acceleration slip. The automatic transmission is inhibited from shifting upon occurrence of an acceleration slip for which the fuel cut is carried out, so as to hold a current shift range, prevent the engine speed from lowering down to a fuel recovery speed, and thereby avoid occurrence of hunting of the traction control.

8 Claims, 3 Drawing Sheets

VEHICLE TRACTION CONTROL SYSTEM

BACKGROUND OF THE INVENTION

1. Field of the Invention

The present invention relates to a traction control system for eliminating acceleration slip of wheels or so-called wheel spinning upon acceleration of the vehicle, and in particular to a traction control system which stops the supply of fuel to an on-board engine so as to eliminate an acceleration slip of the wheels by the fuel cut.

2. Description of Related Art

Acceleration slip of the wheels is generally caused when the drive force of the wheels becomes excessive in view of the relationship to the frictional coefficient of the road surface. Thus, it is possible to eliminate acceleration slip by lowering the driving force to the wheels.

A typical measure for lowering the drive force to the wheels is to lower the output power of the engine that drives the wheels. Thus, there has been proposed a traction control system wherein the output power of the engine is lowered by fuel-cut for stopping the supply of fuel to the engine so as to eliminate the wheel spinning. Such a traction control system is disclosed in JP 10-35329A, for example.

Needless to say, when the engine speed during the fuel-cut is lowered down to a fuel recovery speed for restarting the supply of fuel to the engine, the fuel-cut is interrupted to carry out a fuel recovery or restart the supply of fuel to the engine, to thereby prevent engine stalling.

It has been recognized that the vehicle traction control system relying upon fuel-cut tends to cause a problem upon shifting of an automatic transmission, as explained below. For the sake of convenience, it is assumed that the automatic transmission carries out shifting based on a shift map as shown in FIG. 1, for example. Upon occurrence of an acceleration slip of the wheels, the vehicle speed VSP generally measured from the rotational speed of a moving part between the output shaft of the automatic transmission and the drive axle of each wheel increases, for example, from a point A in the second range to a point B in the third range, and a 2 to 3 upshift is carried out in view of such judgment that the automatic transmission has shifted from the second range into the third range.

When such upshift is carried out by the automatic transmission, the engine speed is also lowered by a value corresponding to the resultant lowering of the gear ratio. In particular, when the wheel slip value is so large as to require an increase in number of the cylinders to which fuel-cut is to be effected, the engine speed may be lowered to the fuel recovery speed due to a significant lowering of the engine output power. In this case, there may occur a control hunting such that the output power of the engine is increased and returned to a regular value with which no traction control is to be carried out, to restart the supply of fuel (fuel recovery) which, in turn, causes an acceleration slip of the wheels occurs once again, thereby requiring the traction control by the fuel-cut.

SUMMARY OF THE INVENTION

It is a primary object of the present invention to eliminate the above-mentioned problem of the prior art, and provide an improved vehicle traction control system which inhibits an automatic transmission from carrying out a speed change caused by erroneous detection of the vehicle speed due to an acceleration slip of wheels, so as to prevent the engine speed from lowering down to a fuel recovery speed, and thereby prevent occurrence of hunting of the traction control.

To this end, according to the present invention, there is provided a vehicle traction control system for a vehicle wherein output power of an engine is transmitted to wheels through an automatic transmission, said traction control system being adapted to eliminate an acceleration slip of the wheels by a fuel-cut with which fuel supply to the engine is stopped upon occurrence of the acceleration slip, wherein said automatic transmission is inhibited from being shifted upon occurrence of an acceleration slip with which the fuel cut is carried out, so as to hold a current shift range.

The traction control system according to the present invention can prevent an acceleration slip by fuel-cut of the engine upon occurrence of an acceleration sip of the wheels. Moreover, upon occurrence of an acceleration slip for which the fuel-cut should be carried out, the shifting of the automatic transmission is inhibited so as to hold the current shift range as it is. It is thus possible to inhibit an upshift of the automatic transmission due to erroneous detection of the vehicle speed as a result of the acceleration slip of the wheels even if, otherwise, an upshift would be performed as a result of the erroneous vehicle speed. Also, since an upshift of the automatic transmission due to erroneous vehicle speed is inhibited, it is possible to prevent the engine speed from being lowered to a fuel recovery speed as a result of the upshift.

As mentioned above, known traction control system relying upon the fuel-cut involves a problem when the number of fuel-cut cylinders is increased for lowering the output power of the engine for eliminating a large acceleration slip value of the wheels, that hunting of the traction control occurs such that the engine increases its output power which is therefore returned to a regular value that would be obtained in the absence of traction control, since the engine speed is decreased down to the fuel recovery speed by the upshift of the automatic transmission, and the acceleration slip of wheels occurs once again so as to carry out the traction control by the fuel-cut. Such a hunting problem can be effectively eliminated by the traction control system according to the present invention.

It is preferred that the inhibition of the automatic transmission from shifting is carried out if the acceleration slip has a value that is larger than a set value for causing an upshift so as to lower the engine speed to a fuel recovery speed with which the supply of the fuel into the engine is restarted. In this instance, the shifting of the automatic transmission is inhibited only upon occurrence of a large acceleration slip of the wheels causing the upshift with which the engine speed is lowered to the fuel recover speed, but otherwise no shift range holding control is carried out, thereby making it possible to avoid unnecessary shift inhibition control.

The holding of the current shift range may be released if the acceleration slip value is sufficiently lowered, and if driver's foot is released from an acceleration pedal. In this instance, it is possible to eliminate an abrupt torque increase due to a downshift caused by depression of the accelerator pedal in association with completion of the traction control following the elimination of the acceleration slip.

Alternatively, or additionally, the holding of the current shift range may be released if the acceleration slip value is sufficiently lowered, and if the automatic transmission carries out either an upshift or no shifting during the releasing of the shift range holding. In this instance, it is possible to eliminate an abrupt torque increase due to a downshift carried out by the automatic transmission in association with completion of the traction control following the elimination of the acceleration slip.

BRIEF DESCRIPTION OF THE DRAWINGS

The present invention will be further explained below with reference to a preferred embodiment shown in the accompanying drawings.

DETAILED DESCRIPTION OF THE PREFERRED EMBODIMENT

Figure 2:
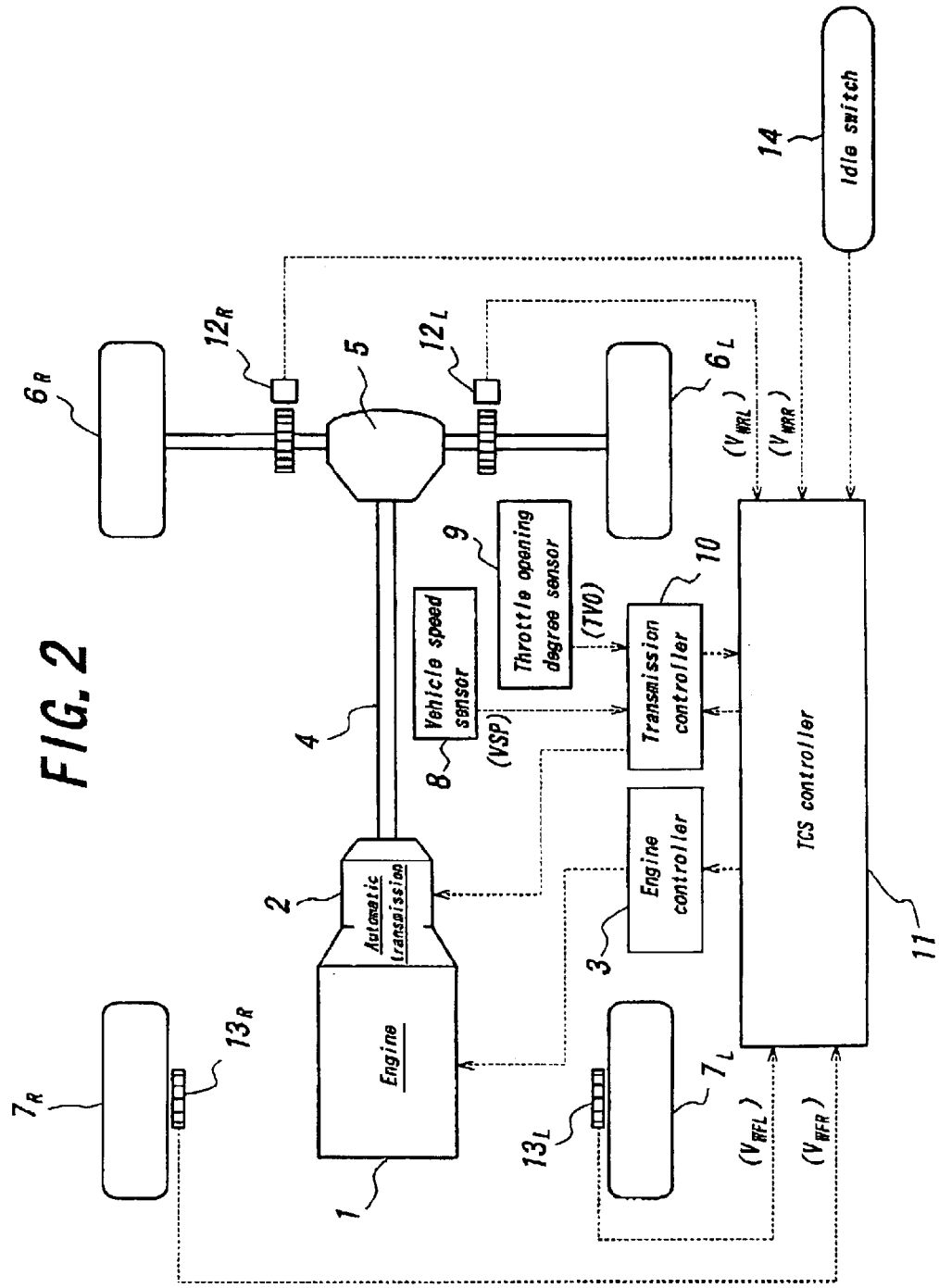
FIG. 2 is a systematic view illustrating a configuration of one embodiment of the traction control system according to the present invention.
Figure 3:
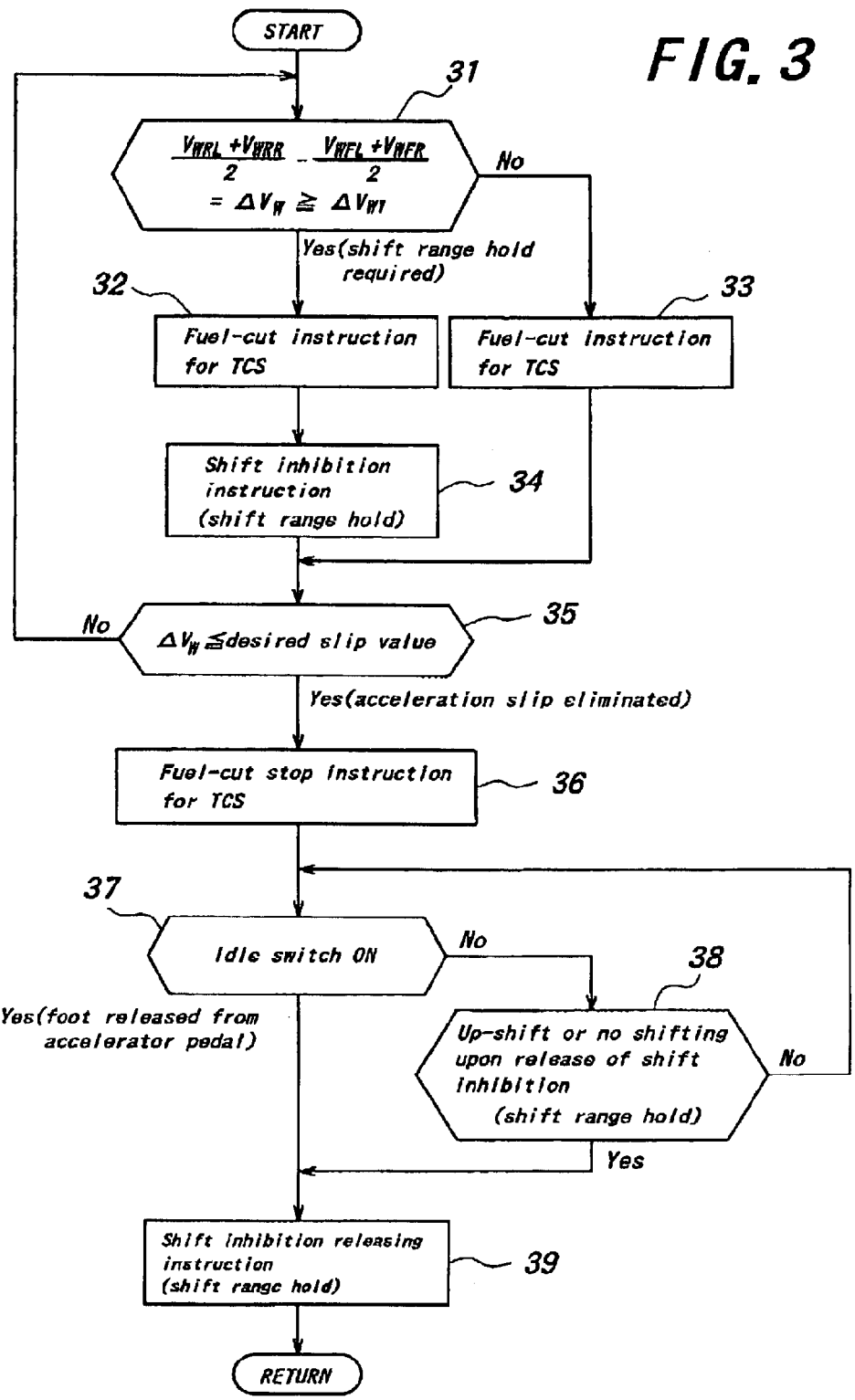
FIG. 3 is a flow chart of the traction control carried out by the TCS controller according to the embodiment of FIG. 2.

FIGS. 2 and 3 show a preferred embodiment of the traction control system according to the present invention, wherein reference numerals 1 and 2 denote an engine and an automatic transmission, respectively. The engine 1 sucks air via a throttle valve having an opening degree that increases from a fully closed value to a fully opened value, corresponding to the depression of the accelerator pedal (not shown) by the driver. The engine 1 is supplied with a mixture of such suction air and fuel from a fuel injection valve, and the air/fuel mixture is combusted in the combustion chamber of the engine 1 so as to drive the vehicle. The engine 1 is associated with an engine controller 3, which controls the fuel supply amount from the fuel injection valve, the combustion timing and other operations.

The automatic transmission 2 changes the rotational speed of the engine 1, and delivers it to a propeller shaft 4 so as to drive rear left and right wheels $6_L$, $6_R$ via a differential gear unit 5. By driving these rear left and right wheels $6_L$, $6_R$, a vehicle runs with the front left and right wheels $7_L$, $7_R$ as driven wheels. The automatic transmission 2 is subjected to shift control by a transmission controller 10, which receives signals from a vehicle speed sensor 8 for detecting the vehicle speed VSP and a throttle opening degree sensor 9 for detecting the throttle opening degree TVO of the engine 1. More particularly, the shift control by the transmission controller 10 is performed such that a shift stage is set in accordance with a shift map related to the vehicle speed VSP and the throttle opening degree TVO, of which an example is shown in FIG. 1.

The illustrated embodiment of the traction control system (TCS) according to the present invention includes a TCS controller 11. The TCS controller 11 receives signals from wheel speed sensors $12_L$, 12R for detecting the rotational peripheral speeds $V_{WRL}$, $V_{WRR}$ of the rear left and right wheels $6_L$, $6_R$ as the driving wheels, signals from wheel speed sensors $13_L$, $13_R$ for detecting the rotational peripheral speeds $V_{FRL}$, $V_{FRR}$ of the front left and right wheels $7_L$, $7_R$ as driven wheels, and a signal from an idle switch 14 which is turned ON when an accelerator pedal is released. The TCS controller 11 carries out a control program shown in FIG. 3 on the basis of these input data so as to carry out a predetermined traction control by fuel-cut through the engine controller 3, as well as a predetermined transmission control for the traction control through the transmission controller 10.

Figure 1:
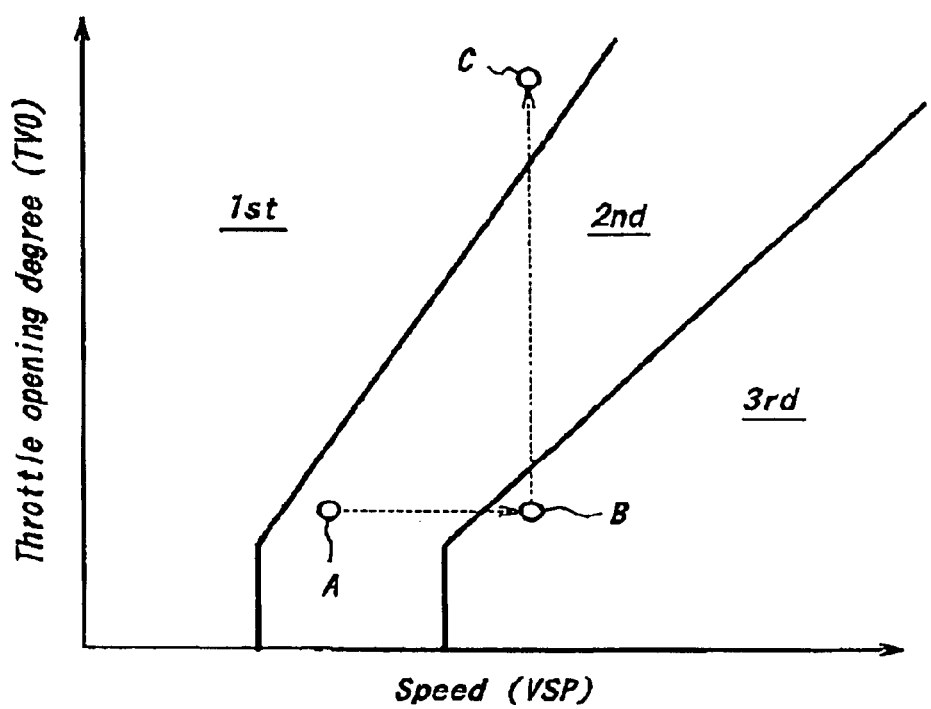
FIG. 1 is a shift pattern diagram of an automatic transmission to which the traction control system according to the present invention may be suitably applied.

In a first step 31 shown in FIG. 1, the TCS controller 11 computes an acceleration slip value $\Delta V_W$ of the wheels $6_L$, $6_R$ from a difference $[(V_{WRL}+V_{WRR})/2]-[(V_{WFL}+V_{WFR})/2]$ between an average value $[(V_{WRL}+V_{WRR})/2]$ of the rotational peripheral speeds $V_{WRL}$, $V_{WRR}$ of the rear left and right wheels $6_L$, $6_R$ as the driving wheel speed, on one hand, and an average value $[(V_{WFL}+V_{WFR})/2]$ of the rotational peripheral speeds $V_{WFL}$, $V_{WFR}$ of the front left and right wheels $7_L$, $7_R$ as the driven wheel speed, on the other hand, and checks whether or not the acceleration slip value $\Delta V_W$ is not less than a predetermined value $\Delta V_{W1}$.

It is noted here that the predetermined value $\Delta V_{W1}$ is a lower limit value of the acceleration slip value, which causes occurrence of an upshift thereby lowering the engine speed to a fuel recovery speed where the fuel supply to the engine 1 is restarted. Thus, the acceleration slip value $\Delta V_W \geq \Delta V_{W1}$ is an indication of a condition wherein the acceleration slip value is so large as to cause an upshift with which the engine speed is lowered to the fuel recovery speed, and it is thus necessary to perform a shift range holding to be explained hereinafter.

Regardless of the determination at step 31, the TCS controller 11 delivers, at step 32 or 33, an instruction for performing fuel-cut or interruption of the fuel supply to a predetermined number of engine cylinders in accordance with the deviation of the acceleration slip value $\Delta V_W$ of the driving wheels $6_L$, $6_R$ from a desired slip value corresponding to an ideal slip rate (i.e., a slip rate under a condition that the frictional coefficient with respect to the road surface becomes maximum), to the engine controller 3 so that the acceleration slip value $\Delta V_W$ is made equal to the desired slip value, thereby carrying out the traction control for eliminating the acceleration slip of the driving wheels $6_L$, $6_R$.

If the determination at step 31 gives a result of $V_W < \Delta V_{W1}$, the TCS controller 11 carries out the traction control only at step 33. On the contrary, if the determination at step 31 gives a result $\Delta V_W \geq \Delta V_{W1}$, that is, if the shift range holding is required to overcome the above-mentioned problem due to a slip condition which would give rise to an upshift so that the engine speed is lowered to a fuel recovery speed, the TCS controller 11 carries out the traction control at step 32, and then delivers a shift inhibition (i.e., shift range holding) instruction to the transmission controller 10.

The next step 35 is to check whether or not the acceleration slip value $\Delta V_W$ of the wheels $6_L$, $6_R$ is lowered to the desired slip value corresponding to the ideal slip rate (the acceleration is settled) by the traction control through steps 32, 33, and steps 31 to 34 are repeated until the acceleration slip $\Delta V_W$ is sufficiently lowered. Thus, the acceleration slip value $\Delta V_W$ of the driving wheels $6_L$, $6_R$ is lowered to the desired slip value corresponding to the ideal slip rate due to the fuel-cut of a predetermined number of cylinders in accordance with the deviation of the acceleration slip value $\Delta V_W$ from the desired slip value, thereby eliminating the acceleration slip value $\Delta V_W$ of the driving wheels $6_L$, $6_R$.

Meanwhile, in the case of such a slip condition that $\Delta V_W \geq \Delta V_{W1}$ is determined (step 31) so as to give rise to an upshift resulting in lowering of the engine speed to a fuel recovery speed, a shift inhibition instruction of the automatic transmission is delivered so as to hold the current shift range at step 34, in addition to the above-mentioned traction control. Thus, even though the automatic transmission 2 carries out the upshift through a shift from, for example, point A in the second range to point B in the third range as shown in FIG. 1 due to an erroneous detection of the vehicle speed VSP caused by an acceleration slip of the driving wheels $6_L$, $6_R$, such upshift can be inhibited, thereby preventing the engine speed from lowering down to a fuel recovery speed.

As a result, it is possible according to the present invention to effectively eliminate the above-mentioned hunting problem of the prior art, which had been caused when the number of fuel-cut cylinders is increased for significantly lowering the output power of the engine to thereby eliminate a large acceleration slip value $\Delta V_W$ of the driving wheels $6_L$, $6_R$.

In the illustrated embodiment, the above-mentioned shift range holding control is carried out if the acceleration slip value $\Delta V_W$ is larger than the predetermined value, that is, $\Delta V_W \geqq \Delta V_{W1}$ (step 31) so as to give rise to such an upshift that the engine speed is lowered to a fuel recovery speed where the fuel supply to the engine is restarted. Thus, the shifting of the automatic transmission is inhibited only upon occurrence of a large acceleration slip of the wheels which would gives rise to an upshift really lowering the engine speed to a fuel recovery speed, and otherwise, shift range holding control is not carried out, thereby avoiding a problem that the above-mentioned shift inhibition is made uselessly.

If the determination is made at step 35 shown in FIG. 3 that the acceleration slip value $\Delta V_W$ of the driving wheels $6_L$, $6^{Ri}$ is decreased to the desired slip value, since the acceleration slip is eliminated, an instruction for completion of the fuel cut for the traction control is delivered to the transmission controller 10 at step 36. However, should the above-mentioned shift inhibition control or shift range holding control be released unconditionally, there would be caused a problem that a downshift to a first range is carried out so as to abruptly increase the torque simultaneously with the completion of the fuel cut for the traction control, if the accelerator pedal is depressed so that the throttle opening degree TVO is increased to a value corresponding to a point C in the first range as shown in FIG. 1.

Therefore, in the illustrated embodiment of the traction control system according to the present invention, as the releasing condition of the shift range holding, in addition to such a condition that the acceleration slip value $\Delta V_W$ is lowered to the desired slip value corresponding to the ideal slip rate (step 35), there are adopted additional conditions that a foot is released from the accelerator pedal (step 37), and/or that an automatic transmission carries out an upshift upon releasing of the shift range holding, and/or no speed change is carried out.

That is, at step 37, whether or not the driver's foot is released from the accelerator pedal is checked, depending upon whether or not the idle switch 14 is turned ON. If it is determined that the driver's foot is released from the accelerator pedal, no downshift occurs. Even if a downshift does occur, an instruction for releasing the shift inhibition (shift range holding) is delivered to the transmission controller 10 in view of determination that no abrupt torque increase occurs since the throttle opening degree is zero, so that a normal shift control is restored. Thus, the shift range holding is not released only when the acceleration slip value $\Delta V_W$ is lowered to the desired slip value (step 35), and is not released for allowing a shifting unless the driver's foot is released from the accelerator pedal. It is thus possible to eliminate a problem of abrupt torque increase due to the downshift caused by the depression of the accelerator pedal in association with the completion of the traction control following the elimination of the acceleration slip.

Even when a determination is made at step 37 that the idle switch 14 is turned OFF (i.e., the accelerator pedal is depressed), if it is determined at step 38 that the automatic transmission carries out an upshift or no shifting upon the release of the shift range holding based on the signal from the transmission controller 10, an instruction for releasing the shift inhibition is delivered to the transmission controller 10 at step 39 so as to restore the normal speed change control in view of such determination that the torque is never increased so as to raise a problem. However, if the determination is made at step 38 that the automatic transmission carries out a downshift upon the releasing of the shift range holding, the control is returned to step 37 so as to continue the shift inhibition or shift range holding as instructed at step 34.

Thus, the shift range holding is not released merely when the acceleration slip value $\Delta V_W$ is lowered down to the desired slip value (step 35), but is released so as to allow shifting if a condition is also satisfied that the automatic transmission carries out an upshift or no shifting is carried out upon the releasing of the shift range holding. Therefore, it is possible to eliminate a problem of abrupt torque increase due to a downshift carried out by the automatic transmission in association with the completion of the traction control following the elimination of the acceleration slip.

While the present invention has been described above with reference to a specific embodiment shown in the accompanying drawings, it has been presented for an illustrative purpose only, and various changes or modifications may be made without departing from the scope of the invention as defined by the appended claims.

What is claimed is:

1. A traction control system for a vehicle wherein output power of an engine is transmitted to wheels through an automatic transmission, said traction control system being adapted to eliminate an acceleration slip of the wheels by a fuel-cut with which fuel supply to the engine is stopped upon occurrence of the acceleration slip, wherein said automatic transmission is inhibited from shifting upon occurrence of an acceleration slip with which the fuel cut is carried out, so as to hold a current shift range.

2. A traction control system according to claim 1, wherein said inhibition of the automatic transmission from shifting is carried out if the acceleration slip has a value that is larger than a set value for causing an upshift so as to lower the engine speed to a fuel recovery speed with which the supply of the fuel into the engine is restarted.

3. A traction control system according to claim 1, wherein said holding of the current shift range is released if the acceleration slip value is sufficiently lowered, and if driver's foot is released from an acceleration pedal.

4. A traction control system according to claim 1, wherein said holding of the current shift range is released if the acceleration slip value is sufficiently lowered, and if the automatic transmission carries out either an upshift or no shifting during the releasing of said holding.

5. A traction control system according to claim 1, wherein said holding of the current shift range is released if the acceleration slip value is sufficiently lowered, and if driver's foot is released from an acceleration pedal, and if the automatic transmission carries out either an upshift or no shifting during the releasing of said holding.

6. A traction control system according to claim 2, wherein said holding of the current shift range is released if the acceleration slip value is sufficiently lowered, and if driver's foot is released from an acceleration pedal.

7. A traction control system according to claim 2, wherein said holding of the current shift range is released if the acceleration slip value is sufficiently lowered, and if the automatic transmission carries out either an upshift or no shifting during the releasing of said holding.

8. A traction control system according to claim 2, wherein said holding of the current shift range is released if the acceleration slip value is sufficiently lowered, and if driver's foot is released from an acceleration pedal, and if the automatic transmission carries out either an upshift or no shifting during the releasing of said holding.

* * * * *